United States Patent
Lucand et al.

(10) Patent No.: US 6,745,681 B2
(45) Date of Patent: Jun. 8, 2004

(54) LIGHT DISCHARGE GATE FOR LARGE ROUND BALER

(75) Inventors: Philippe Lucand, Melin (FR); Jean Viaud, Gray (FR)

(73) Assignee: Deere & Company, Moline, IL (US)

( * ) Notice: Subject to any disclaimer, the term of this patent is extended or adjusted under 35 U.S.C. 154(b) by 47 days.

(21) Appl. No.: 10/281,475

(22) Filed: Oct. 25, 2002

(65) Prior Publication Data

US 2003/0084792 A1 May 8, 2003

(30) Foreign Application Priority Data

Oct. 30, 2001 (DE) .......................... 101 53 540

(51) Int. Cl.⁷ .............................. B30B 9/30
(52) U.S. Cl. ........................... 100/88; 56/341
(58) Field of Search .................. 100/87, 88, 89, 100/3, 7, 8, 5; 56/341, 343

(56) References Cited

U.S. PATENT DOCUMENTS

| | | |
|---|---|---|
| 3,914,926 A | 10/1975 | Braungerger et al. |
| 4,088,069 A * | 5/1978 | Soteropulos ............. 100/88 |
| 4,172,354 A * | 10/1979 | Vermeer et al. ........... 56/341 |
| 4,393,764 A | 7/1983 | Viaud |
| 4,683,815 A * | 8/1987 | Van Ryswyk ............. 100/88 |
| 4,899,651 A | 2/1990 | Lausch et al. ............ 100/87 |
| 4,912,918 A | 4/1990 | Jennings et al. |
| 5,444,969 A | 8/1995 | Wagstaff ................. 56/341 |

FOREIGN PATENT DOCUMENTS

| | | |
|---|---|---|
| DE | 198 51 470 | 5/2000 |
| DE | A1-198 51 470 | 5/2000 |
| EP | 0 894 428 | 4/1998 |
| FR | 2 460 099 | 1/1981 |

OTHER PUBLICATIONS

U.S. patent application Ser. No. 10/163,156, Viaud, filed Jun. 4, 2002.
FMO—141B, Book Edition D–00, no publication date, p. 153.
Vermeer 504 HE, (prospectus), no publication date.
Deere & Co. Docket #9090–US, (to be assigned a U.S. Application No. and filing date), which was mailed to the Patent & Trademark Office on Oct. 22ⁿᵈ, 2002.

* cited by examiner

*Primary Examiner*—Allen Ostrager
*Assistant Examiner*—Shelley Self

(57) ABSTRACT

A large round baler includes bale-forming means conducted over rotary bodies with stationary axes and rotary bodies with movable axes so as to define an expansible circumference of a baling chamber. Some of the movable rotary bodies are mounted to a carrier mounted to fixed side walls defining opposite sides of the baling chamber. The carrier is pivotally mounted to opposite side walls defining opposite sides of the baling chamber for movement between a lowered operating position and a raised discharge position wherein it holds a span of the bale-forming means, which during operation, forms the rear portion of the circumference of the baling-chamber above the formed bale so that the latter may be discharged.

7 Claims, 4 Drawing Sheets

LIGHT DISCHARGE GATE FOR LARGE ROUND BALER

FIELD OF THE INVENTION

The invention concerns a large round baler with at least one endless flexible bale-forming means that is conducted over rotary bodies, of which some are mounted on stationary axes and others are mounted on movable axes, and generally delimits a circumference of a baling chamber.

BACKGROUND OF THE INVENTION

The book FMO-141B Edition D-00 shows a large round baler on page 153 with fixed side walls between which rotating bodies extend which have both stationary axes and movable axes over which belts are conducted. Several of the rotating bodies are engaged in a carrier that can be pivoted vertically. The belts are also conducted over rotating bodies on a tensioning arm, that is constantly forced into a position that applies tension to the belts. The advantage of this configuration lies in the fact that the carrier with the few rotating bodies is light and does not require large positioning forces. However, the disadvantage is that the carrier must be raised through a large distance in order to permit ejection of the finished cylindrical bale, particularly since a second set of belts is provided upon which the cylindrical bale rests during its formation.

DE-A1-198 51 470 discloses a large round baler with only a single set of belts that are conducted over rotating bodies on stationary axes and rotating bodies whose position is movable in a fixed housing and in a housing section that can be pivoted. A tensioning arm is also provided that applies constant tension to the belts. The disadvantage of this configuration lies in the high positioning forces that are necessary to raise the movable housing section and the large positioning path required in order to be able to eject the cylindrical bale from the baling chamber.

The prospectus VERMEER 504 HE, no publication date, shows a large round baler in which the pivot point of a carrier that extends outside the baling chamber is located almost in the central region of the baling chamber. At the outer end region of the carrier, an arm is provided on which several rotating bodies are located over which belts extend and that can penetrate into the baling chamber. In this case, the tensioning arrangement forms several loops in which crop can collect.

Pending U.S. patent application Ser. No. 10/163,156, filed Jun. 4, 2002, discloses a large round baler with fixed side walls outside of which arms are attached that can pivot vertically to which two rotating bodies are attached that are spaced at a distance from each other. Along with belts extending over them, the rotating bodies form the bottom of the baling chamber and can be brought into a raised position along with edges of two side walls in which a sufficiently large opening to the ground develops rapidly through which the cylindrical bale can be ejected. A tensioning arm is provided in the forward region of the large round baler and is provided with a spring loaded roll over which the belts extend and form a loop.

The problem underlying the invention is seen in the need to propose a compact large round baler that requires low positioning forces and positioning paths during the operation.

SUMMARY OF THE INVENTION

This problem is solved according to the invention by a round baler structure wherein bale-forming belts are mounted to a carrier that is mounted for pivoting vertically relative to opposite side walls forming the sides of a baling chamber, the carrier lifting the bale-forming belts to a position permitting discharge of a completed bale.

The arrangement of two adjoining rotary bodies at the carrier, between which the bale-forming means extends, has the advantage that the bale-forming means is in contact, first with the one rotary body and then with the other rotary body, depending on the position of the carrier. In this way, a loop can be formed by means of the carrier so that the tensioning path for the tensioning mechanism is shortened. The bale-forming means can be configured as a set of narrow, parallel belts, as a band or as a bar chain conveyor. As a rule, the rotary bodies are rotating bodies or rolls, but may also be sprockets in the case of a bar chain conveyor. The configuration of the carrier is conceivable in many ways, for example, as a part with multiple surfaces, as a latticework of tubes, as an arm with a corresponding curvature, as a side wall in itself or the like. This carrier can also be configured relatively massively if it extends and moves on the outside of the side walls of the baling chamber. Since only the carrier, its rotating bodies, and the corresponding section of the belts are moved in order to eject the bale, but not the side walls, the repositioning forces are low. The repositioning paths are also short if the carrier, with its rotary bodies and the section of the bale-forming means running over it, form the bottom of the baling chamber and the bale can fall to the ground with only a small upward stroke of the carrier.

The support of the carrier in bearings, at least in the central region of the baling chamber, has the effect of a rapid opening of the baling chamber for the ejection of the bale in contrast to a bearing support from above, so that the baling operation can be resumed very rapidly. The raised carrier barely touches the bale after its ejection, because due to its at least approximately central bearing support, the radial extent is considerably less than in the state of the art.

The repositioning path of the carrier is not reduced by fixed rotary bodies that are located in the border region of the baling chamber if these fixed rotary bodies are located in a region in which the carrier with its rotary bodies intrudes only to a limited extent and if the rotary bodies provide space between them into which the carrier can penetrate.

If one rotary body on the carrier, on the one hand, is associated with a second with a radial offset, that prevents any contact of the spans of the bale-forming means with each other. As an alternative, a rotary body with a larger diameter could also be used.

A triangular configuration of the carrier provides a stable arrangement that can also save space. The arrangement of the one corner region, as a bearing, assures a positive transmission of the forces.

If the carrier simultaneously represents the side wall of the baling chamber, the result is a reduction in the number of parts. The stiffness can be attained by ribs, crimps, edging or the like, instead of tubes, struts or the like. The position of the rotary bodies relative to the side wall or the side walls does not change. When the rotary bodies with the carrier and therewith the side walls are raised for the ejection of the cylindrical bale, the crop to be baled that has accumulated on the outside of the baling chamber is ejected from the large round baler.

If during the baling operation and during the ejection operation, the two rotary bodies of the carrier that provide a deflection of the bale-forming means, are located at the same distance or generally at the same distance from a fixed rotary body, a maximum shortening can be performed at one time and a maximum corresponding lengthening of the bale-forming means can be performed at another time.

If the side walls can be repositioned relative to a chassis of the large round baler, they can be spaced apart from each other for the ejection of the cylindrical bale so that the friction forces from this are omitted and it can easily be ejected from the baling chamber.

Rotary bodies that extend outside the baling chamber, that is, extend to the side beyond it, or are at least even with this, and if necessary, move along the end edges of the side walls, permit a movement of the side walls.

BRIEF DESCRIPTION OF THE DRAWINGS

The drawings show an embodiment of the invention that shall be described in greater detail in the following.

DESCRIPTION OF THE PREFERRED EMBODIMENT

Figure 1:
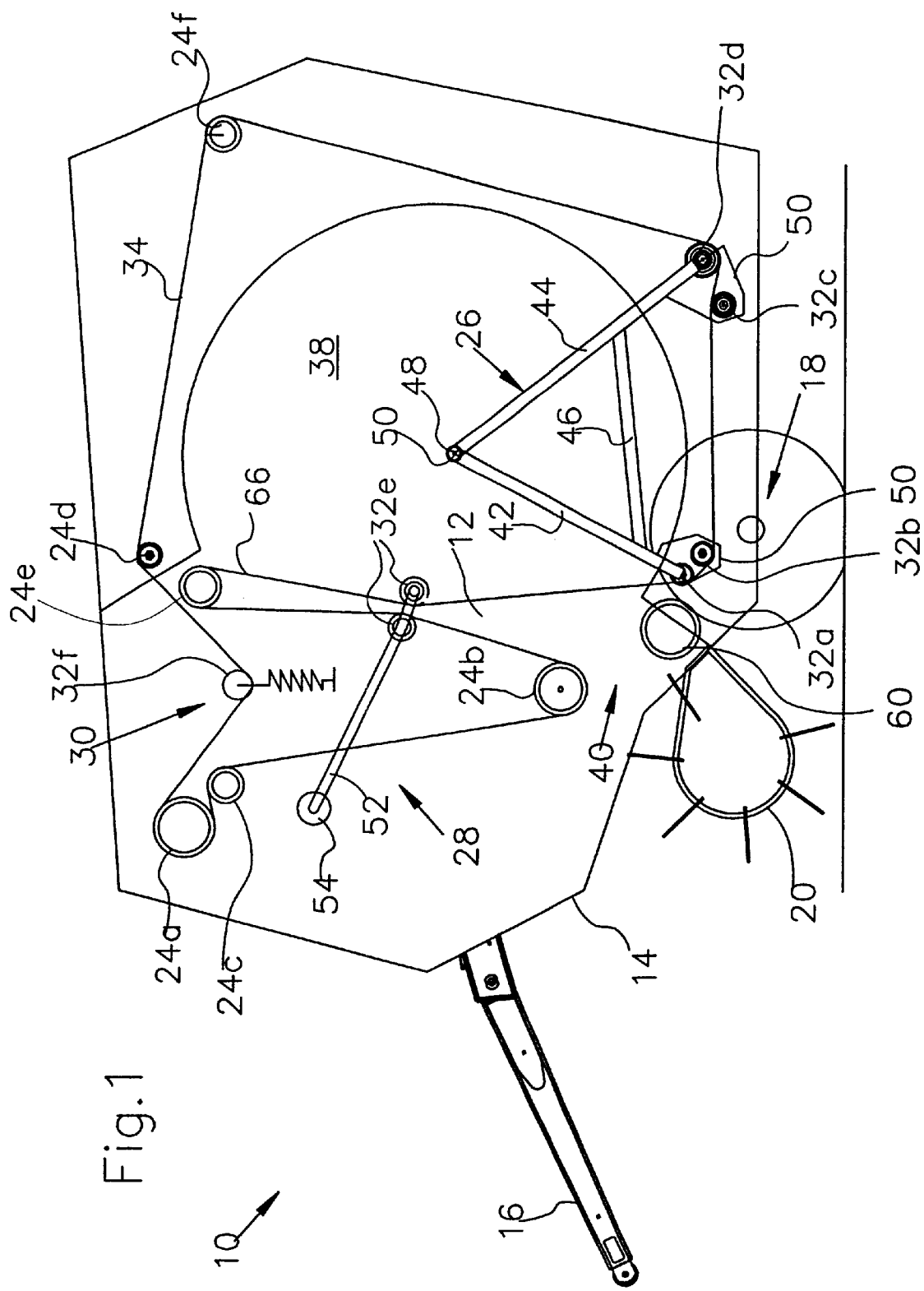
FIG. 1 is a schematic left side view of a large round baler, according to the invention, shown in an empty operating condition.

FIG. 1 shows an agricultural large round baler 10 with a baling chamber 12. Among other components, the large round baler 10 is equipped with the following: a chassis 14, a towbar 16, a running gear 18, a take-up arrangement 20, rotary bodies with stationary axes 24a–f a-f, a carrier 26, a tensioning mechanism 28, a second tensioning mechanism 30, rotary bodies with movable axes 32a–f a—f, and a bale-forming means 34.

The large round baler 10 is used to take up harvested crop, such as straw and hay, that is rolled in a spiral shape upon itself to a round cylindrical bale 36, is bound, and is subsequently deposited on the ground. While the bale 36 is being ejected from the baling chamber 12, the take-up of crop and the baling process is interrupted.

The baling chamber 12 is variable in its size, that is, its diameter increases with the size of the bale 36. While the baling chamber 12 is essentially surrounded on its circumference by the bale-forming means 34, it is closed at its sides by side walls 38. In an embodiment, not shown, a second bale-forming means is provided underneath the baling chamber 12 on which the bale 36 rests completely or partially.

The chassis 14 is configured in known manner as a weldment that holds together or carries the towbar 16, the running gear 18, the take-up arrangement 20, the rotary bodies with stationary axes 24a–f, the carrier 26, the tensioning mechanism 28, the second tensioning mechanism 30, and the side walls 38. For this purpose, transverse struts, not shown, are also provided that assure a rigid assembly in space. The configuration of the chassis 14, itself, is conventional in nature.

The towbar 16 is used for the connection to a towing vehicle, not shown, for example, an agricultural tractor.

The running gear 18 contains an axle and wheels, not especially identified, with which the chassis 14 is supported on the ground. The running gear 16 is connected rigidly, and if necessary, spring loaded with the chassis 14.

The take-up arrangement 20 is configured in known manner as a so-called pick-up that takes up crop lying on the ground with circulating tines and conveys it to the rear in the direction of the baling chamber 12. In addition, a cutting arrangement may be provided downstream that is also of known configuration and which reduces the crop on its path between the take-up arrangement 20 and an inlet 40 in the baling chamber 12.

The rotary bodies, with stationary axes 24a–f, are configured as rotating bodies or rolls of steel, and if required, coated with plastic. The rotary bodies, with stationary axes 24a–f, are either supported on an axle, free to rotate or are provided with stub shafts that engage bearings in the chassis 14, free to rotate. The rotary bodies 24a–f are provided with varying diameters and are equipped, if necessary, with guide devices such as ribs, projections or the like for the bale-forming means 34. In this special embodiment, a total of six rotary bodies with stationary axes 24a–f are provided, in particular, forward upper, forward lower, forward center, center upper, center lower, and rear, which are designated individually with 24a- through 24f, respectively. The rotary bodies 24a–f extend at least over the entire width of the baling chamber 12, and if necessary, beyond that. At least one of the rotary bodies 24a–f can be driven. All rotary bodies with stationary axes 24a–f—except the forward lower rotary body 24b—are located near a generally horizontal plane above the baling chamber 12. The rear rotary body 24f is located in a rear upper corner region of the chassis 14 and is spaced approximately equidistant from the rotary bodies 32c, 32d, when the carrier 26 is located in one of its end positions.

The carrier 26 is configured generally in the shape of a triangle with first and second legs 42 and 44 that are rigidly connected to each other by a rod 46. The first and second legs 42 and 44 meet at a corner where a bearing 48 is located that is in a bearing component 50 mounted on the side walls 38. The legs 42 and 44 diverge from this corner 48. The bearing component 50 is located in or close to the center of the baling chamber 12 or to the side wall 38. On each side of the large round baler 10, a carrier 26 and a bearing component 50 are provided, in particular in each case on the outside of the side wall 38. At the radially outermost end region of the first leg 42, first and second rotary bodies with movable axes 32a, 32b are provided, and at the radially outer end region of the second leg 44, first and second rotary bodies with movable axes 32c, 32d are provided, each of which engages the carrier 26, free to rotate. The first and the second rotary bodies 32a through 32d extend on parallel axes and in each case with little spacing from each other. The first rotary body 32a is attached directly to the forward leg 42 and the second rotary body 32d is attached directly to the second leg 44 while each of the associated rotary bodies 32b and 32c are attached to an arm 50 projecting from each of the legs 42, 44. The second rotary body 32b of the first leg 42 is located radially further outward than the first rotary body 32a. The repositioning of the carrier 26 is performed by a servo motor, not shown, for example, in the form of a hydraulic cylinder, a rotating hydraulic motor with a gearbox, an electric or pneumatic motor or the like. The carrier 26 can be pivoted between two end positions, that is, a lower end position, in which the rotary bodies 32a through 32d are located generally close to a horizontal plane underneath the baling chamber 12 and a position that is indexed upward through almost 180°, in which the rotary bodies 32c, 32d of the second leg 44 come to rest between the center upper and the rear rotary body with stationary axes 24d and 24f—see FIG. 4. The rotary bodies 32a through 32d are configured similar to the rotary bodies 24*a–f* and also extend at least over the width of the baling chamber 12. The maximum radial extent of the carrier 26 starting from the bearing component 50 is less than the distance between the bearing component 50 and the rear rotary body with stationary axis 24*f*. Instead of being configured as lattice work, the carrier 26 can also be configured with several surfaces and thereby simultaneously form the side wall 38.

The tensioning mechanism 28 includes a tensioning arm 52, two rotary bodies with movable axes 32*e*, spaced at a distance from each other, and a tensioning element, not shown. The tensioning arm 52 and the tensioning element are each located once on either side of the large round baler 10. In this embodiment, each tensioning arm 52 is supported in a bearing 54 in the region between the front lower rotary body with stationary axis 24*b*, and the front center rotary body with stationary axis 24*c* so as to be able to pivot vertically, and extends vertically to just below the center lower rotary body 24*e*. The rotary bodies 32*e* are located at the radially outer end region of the tensioning arm 52. The tensioning element is configured in the usual way as a mechanical spring or as a hydraulic motor that can move against a possibly variable resistance. Such a resistance can be created by means of a preferably adjustable throttle in a hydraulic circuit as is well known in itself. The magnitude of the resistance simultaneously determines the density and the maximum weight of the bale 36. The tensioning arm 52 is configured and arranged in such a way that it does not collide with the carrier 26. Preferably, the tensioning arms 52 are connected to each other in the region of the rotary bodies 32*e* with sufficient stiffness to avoid twisting, and pivot together as an inverted "U".

The second tensioning mechanism 30 is shown more symbolically than as actual structure and contains a spring loaded rotary body 32*f* that maintains tension on the bale-forming means 34 in addition to the tensioning mechanism 28 and does not necessarily require a control.

The rotary bodies 32*a–f* can move in their location where their position is a function of the tension in the bale-forming means 34 and the position of the carrier 26. The rotary bodies 32*a* through 32*d*, that are supported in bearings on the carrier 26, extend at least completely over the width of the baling chamber 12 so that they can be moved on the outer edge of the rear part of the side walls 38 or at a distance to these.

Figure 3:
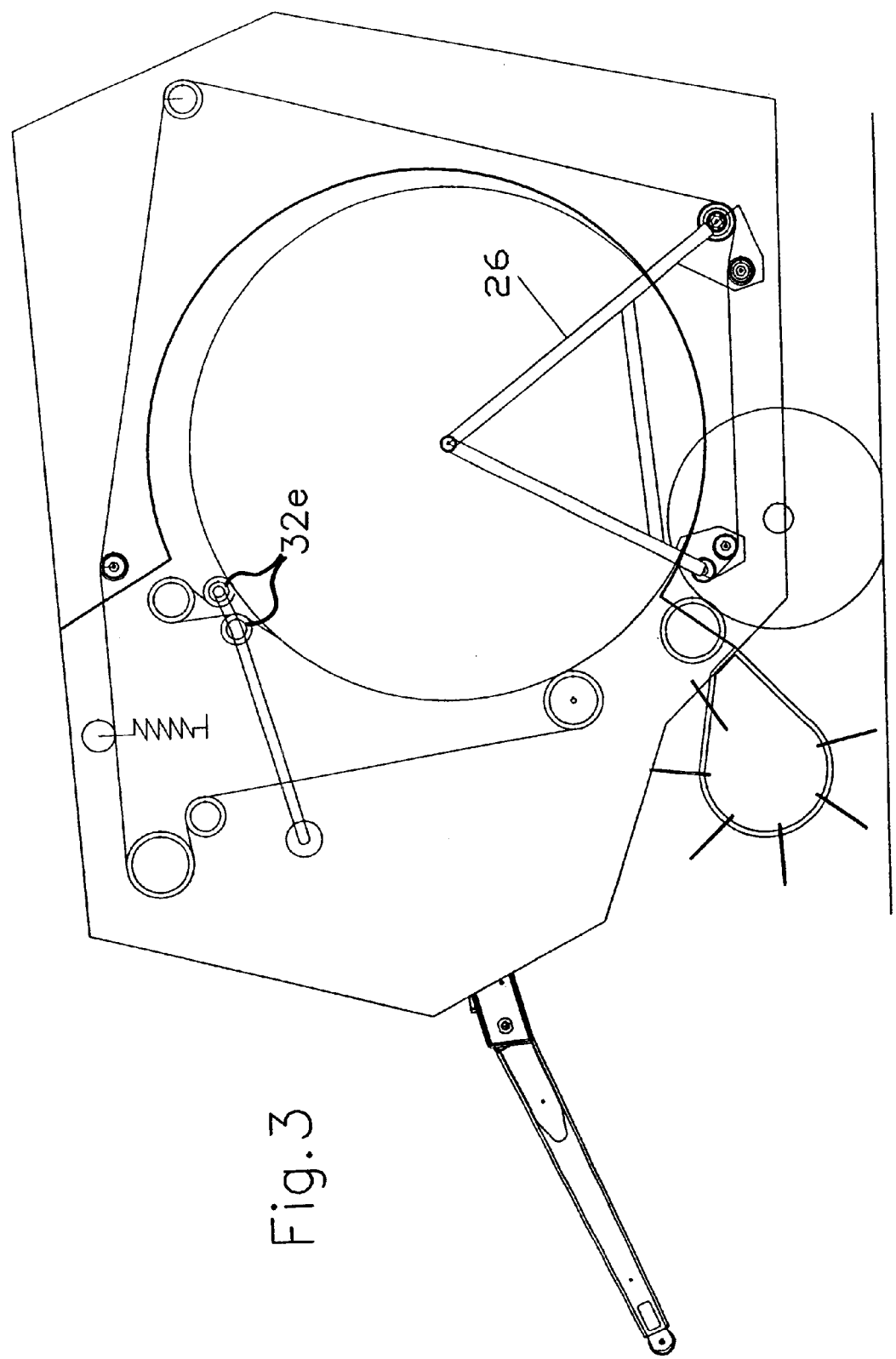
FIG. 3 is a view like that of FIG. 1, but showing the large round baler in a filled condition.

In this embodiment, the bale-forming means 34 is composed of a multitude of narrow, flat, flexible, and endless belts extending parallel to each other, as is known in itself. This bale-forming means 34 extends over, among other items, the fixed rotary bodies with movable axes 24*a–f* and with stationary axes 32*a–f*, and is brought into contact at all times with at least one driven rotary body with stationary axis 24*a–f* by means of the tensioning mechanism 28 and the second tensioning mechanism 30 so strongly that it can be assuredly carried along. As is shown in the illustrations of FIGS. 1 and 3, the bale-forming means 34 may occupy an initial position in which it forms an inlet 40 of a triangular baling chamber 12 that extends mainly vertically, and an end condition in which it surrounds the bale 36 in a loop. Starting from an empty baling chamber 12, the course of the bale-forming means 34 is from the rear rotary body 24*c* and as seen in the clockwise direction as follows: over the rotary body with stationary axis 24*f*, under the rotary body 32*d*, over the rotary body 32*c*, under the rotary bodies 32*b* and 32*a*, between the rotary bodies 32*e*, above over the center lower rotary body with stationary axis 24*e*, return between the rotary bodies 32*e*, under the forward lower rotary body with stationary axis 24*b*, over the forward center rotary body with stationary axis 24*c*, and around this, over approximately 240°, around the forward upper rotary body 24*a*, under the rotary body 32*f* of the second tensioning mechanism 30, over the center upper rotary body with stationary axis 24*d*, and back to the rear rotary body with stationary axis 24*f*—see FIG. 1.

During its formation, the bale 36 is located in the baling chamber 12 and is largely surrounded by the bale-forming means 34, but falls to the ground out of the baling chamber 12, that is, the space between the side walls 38, as soon as—as shall be described later—the carrier 26 with the rotary bodies with movable axes 32*a–d* pivots upward in counterclockwise direction as seen in the drawings.

The side walls 38 correspond in their size and shape, at least in the rear region, generally to the end faces of a completed bale 36 in its largest dimension. The side walls 38 are configured separately from the chassis 14, where the chassis 14 can be equipped with its own side walls that are primarily provided for protection. In contrast to a large proportion of the state of the art, the side walls 38 extend in a one-piece configuration over the entire end face of the baling chamber 12. The side walls 38 are preferably manufactured from steel sheet, extend in the downward direction, possibly diverging slightly, and are welded at appropriate locations. Furthermore, the side walls 38 may be supported in bearings so as to be able to move to a limited degree transverse to the direction of operation so that they reduce the contact force of the bale 36 on their inner sides during bale ejection so that the bale can be ejected more easily and hence more rapidly. It would, for example, be sufficient if the side walls 38 are moved apart from each other by a few centimeters. This characteristic can be performed alone for itself and represents an innovation in itself. The side walls 38 may be configured as movable together with the carrier 26.

The inlet 40 is bordered at the top by the forward lower rotary body 24*b* with the bale-forming means 34 extending over it and bordered on the bottom by a roll 60. Nevertheless, the lower boundary could also be formed by the rotary body 32*a*. The inlet 40 represents generally the location at which the bale 36 is not surrounded by the bale-forming means 34.

The roll 60 is preferably driven and is provided downstream of, and borders on, the take-up arrangement 20. Preferably, the roll 60 is provided on its circumferential surface with drivers or ribs not described in any further detail that assure a positive transport of the harvested crop between the take-up arrangement 20 and the baling chamber 12. This roll 60 forms the lower boundary of the inlet 40 and is opposite the forward lower rotary body 24*b* and is located in the immediate vicinity of the first forward rotary body 32*a* at the first leg 42 when the carrier 26 is located in its lower forward end position.

On the basis of the above description the configuration and the operation of the large round baler 10 according to the invention is as follows:

As long as no crop is conducted to the large round baler 10 and the baling chamber 12 is empty, the carrier 26 is located in its lower forward end position, in which the first forward rotary body 32*a* is located at the first leg 42 near the roll 60 and the rotary bodies 32*a* through 32*d* are located close to a generally horizontal plane. The tensioning arm 52 is forced to the rear and downward so that it assumes an inclination of approximately 30° to the horizontal and its rotary bodies 32*e* are located close to the forward lower rotary body with stationary axis 24*b*. Between the rotary bodies with movable axis 32e at the end of the tensioning arm 52 and the intervening center lower rotary body 24e, the bale-forming means 34 forms a loop 66. Finally, a section of the bale-forming means 34 extends over the inner side of the roll 60 and the rear rotary body 32e on the tensioning arm 52 and therewith opposite the inlet 40. This situation corresponds to that shown in FIG. 1.

Figure 2:
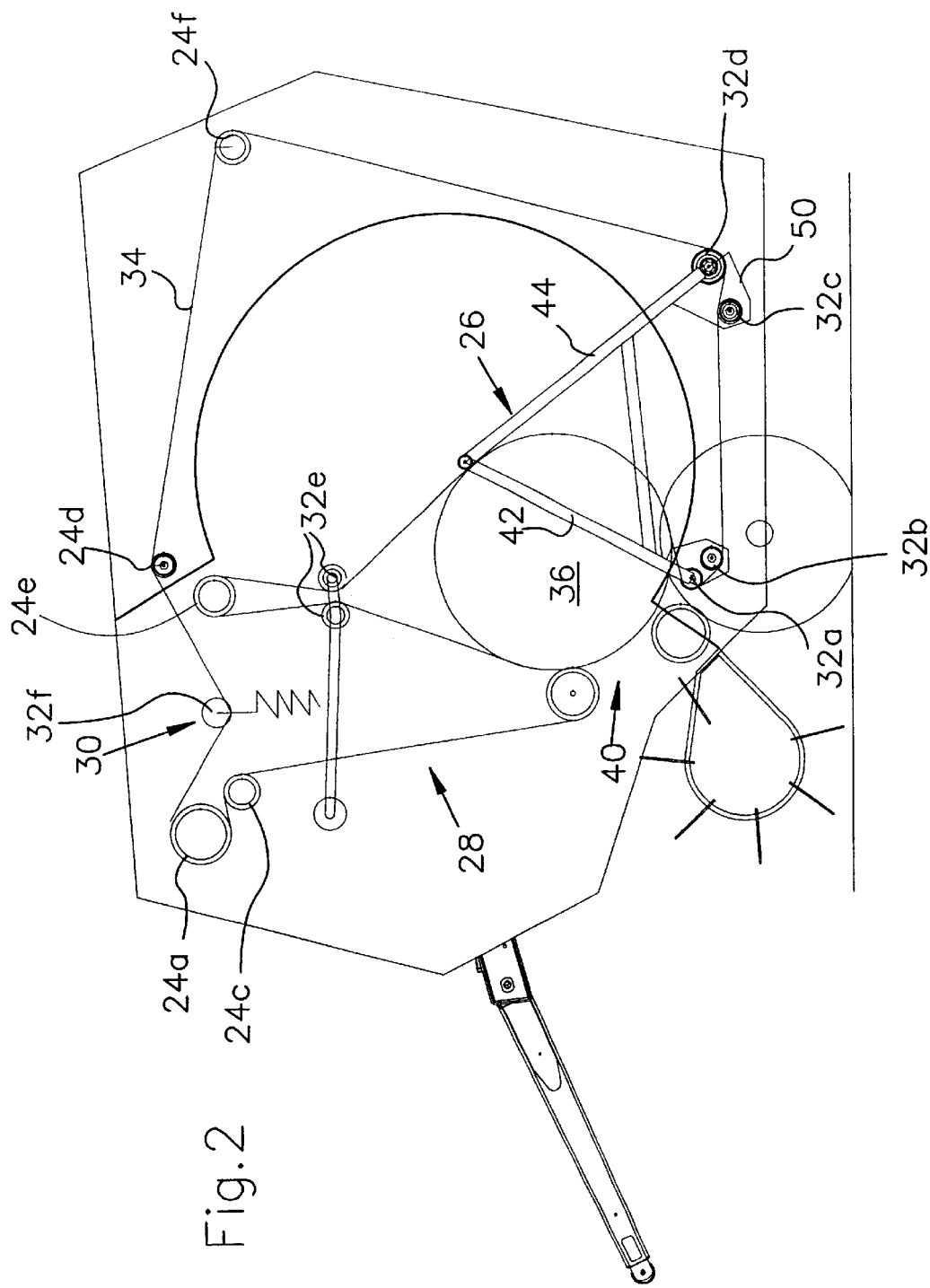
FIG. 2 is a view like that of FIG. 1, but showing the large round baler in a partially filled condition.

As soon as the take-up arrangement 20 conveys harvested crop to the baling chamber 12, it will deflect the section of the bale-forming means 34 opposite the inlet 40 towards the interior of the baling chamber 12, which has the result that the tensioning arm 52 begins to move upward in order to shorten the initially large loop 66. As the bale diameter increases, the tensioning arm 52 moves further upward until it finally assumes its position shown in FIG. 3. Although the diameter of the bale increases, the carrier 26 remains in its position shown in FIGS. 1 through 3.

Figure 4:
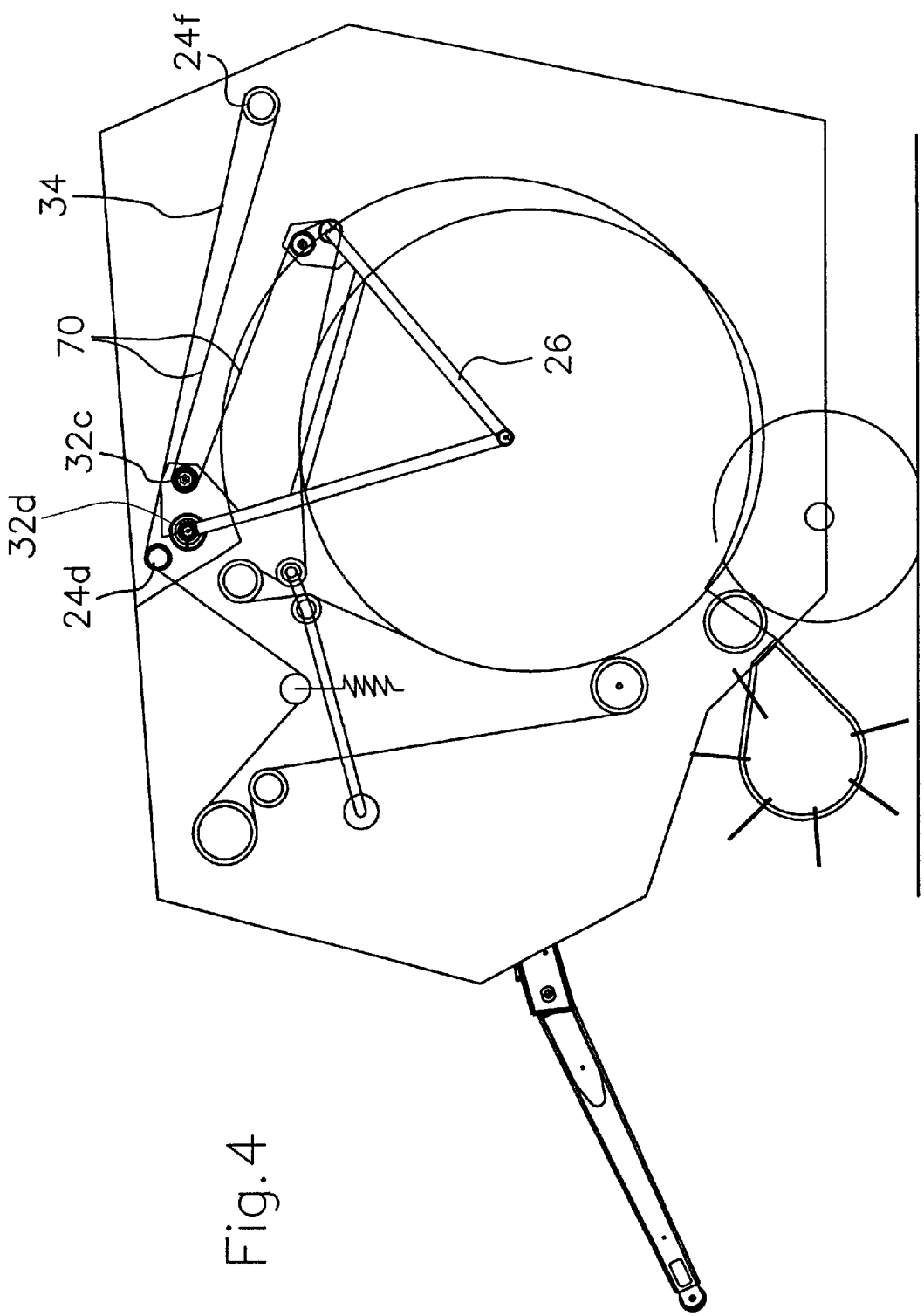
FIG. 4 is a view like that of FIG. 1, but showing the large round baler in a bale discharging condition.

When the bale 36 has reached its largest diameter—see FIG. 4—the bale 36 rests at its front on the roll 60 and the adjoining first rotary body 32a. Otherwise, the bale 36 is retained by the tension in the bale-forming means 34 out of contact with the first and the second rotary body 32c, 32d and the sections of the bale-forming means running over them. If necessary, a further roll, not shown, that supports the bale 36 may be provided between the two second legs 44. As can also be seen in FIG. 3, on the basis of the radial offset of the first and the second rotary body 32a and 32b at the first leg 42, the adjacent spans of the bale-forming means 34 are retained so that they do not interfere with each other. In this condition, the bale 36 can be bound or wrapped with foil or net, so that it does not fall apart after ejection from the baling chamber 12.

After the bale 36 has been fully formed, it can be ejected from the baling chamber 12 for which purpose the carrier 26 is pivoted in counterclockwise direction to the rear and upward. In particular, on the basis of the coupling between the carrier 26, in or close to the center of the side walls 38, the bale 36 will fall to the ground after only a short pivoting path of the carrier 26 of, for example, approximately 90°. After a pivoting path of approximately 180° the first rotary body 32a at the first leg 42 is located at such a distance from the ground that the large round baler 10 can be operated further in the forward direction without coming into contact with the bale 36. When the carrier 26 is located in its upper end position, the bale-forming means 34 forms a second loop 70, about the rotary body 32c, so that the section of the bale-forming means 34, that was previously looped about the bale 36, is taken up by this second loop 70 and the bale-forming means 34 is retained under tension. In this situation, the first and the second rotary bodies 32a, 32b are located between the center upper rotary body 24d and the rear rotary body 24f.

As soon as the bale 36 has been rolled out of the baling chamber 12, the carrier 26 is again pivoted downward into the position shown in FIG. 1. During this path, the bale-forming means 34 is again tensioned and thereby the tensioning arm 52 is again moved downward.

Having described the preferred embodiment, it will become apparent that various modifications can be made without departing from the scope of the invention as defined in the accompanying claims.

What is claimed is:

1. In a large round baler, having chassis-supporting components forming an expansible baling chamber and including at least one endless, flexible bale-forming means, that is conducted over rotary bodies with stationary axes and rotary bodies with movable axes, and that generally surrounds the circumference of a baling chamber with said rotary bodies with stationary axes including a first rotary body with a fixed axis being located at a forward side of an inlet leading to a baling chamber having a circumference otherwise surrounded by said flexible bale-forming means, and having opposite sides defined by opposite side walls, the improvement comprising:

a) a carrier mounted to said opposite side walls exteriorly of said baling chamber for pivoting vertically between a lowered operating position, and a raised bale discharge position;

b) said rotary bodies with movable axes including first, second, and third rotary bodies with respective movable axes mounted to said carrier, with said first rotary body with a movable axis being positioned at a location adjacent an opposite side of said inlet from said first rotary body with a fixed axis when said carrier is in said operating position, and with said second and third rotary bodies with movable axes being mounted adjacent each other at a location spaced rearward from said first rotary body with a moveable axis and forming a slot between the last-named second and third rotary bodies;

c) at least one tensioning mechanism including a least a fourth rotary body with movable axis;

d) a first span of said bale-forming means extending between said first and fourth rotary bodies with movable axes and forming a rear expansible section of the circumference of said baling chamber, with its tension being determined at least in part by said at least one tensioning mechanism; and e) a second span of the bale-forming means extending rearwardly from said first rotary body with a moveable axis through said slot, whereby movement of said carrier to said bale discharge position will result in said first and second spans of said bale-forming means being elevated so as to permit a completed bale to be discharged from said baling chamber.

2. The large round baler as defined in claim 1, wherein said carrier is mounted for pivoting about an axis approximately coincident with that of a bale formed to a full size in said baling chamber.

3. The large round baler as defined in claim 1, wherein said rotary bodies with stationary axes include at least three rotary bodies with stationary axes in addition to said first rotary body with a stationary axis, these three rotary bodies being spaced fore-and-aft from each other at respective locations above said baling chamber; and said second and third rotary bodies with movable axes being located relative to two of said three rotary bodies with stationary axes that said second and third rotary bodies with movable axes are positioned between said two of said three rotary bodies with stationary axes when said carrier is moved to said discharge position.

4. The large round baler as defined in claim 1, wherein a fifth rotary body with a movable axis is mounted on said carrier adjacent to, but radially offset with respect to an axis about which said carrier is pivotable from, said first rotary body with a movable axis.

5. The large round baler as defined in claim 1, wherein said carrier is configured in the shape of a triangle having one corner region pivotally supported.

6. The large round baler as defined in claim 1, wherein said rotary bodies with stationary axes include at least three rotary bodies with stationary axes in addition to said first rotary body with stationary axis, these three rotary bodies being spaced fore-and-aft from each other at respective locations above said baling chamber; and said second and third rotary bodies with movable axes being located relative to a rearmost of said three rotary bodies such that the distance between said second and third rotary bodies with movable axes and said rearmost of said three rotary bodies with movable axes is substantially the same when said carrier is in either its lowered operating position or in its raised bale discharge position.

7. The large round baler as defined in claim 1, wherein said first, second and third rotary bodies with movable axes that are mounted to the carrier are each located outside said circumference of said baling chamber.

* * * * *